United States Patent
Bae et al.

(10) Patent No.: US 11,858,076 B2
(45) Date of Patent: Jan. 2, 2024

(54) METHOD OF OPERATING FASTENING APPARATUS AND FASTENING APPARATUS

(71) Applicants: HYUNDAI MOTOR COMPANY, Seoul (KR); KIA CORPORATION, Seoul (KR)

(72) Inventors: Jun Hyeok Bae, Ulsan (KR); Do Kyoung Ji, Busan (KR); Se Hoon Ham, Ulsan (KR); Dong Ho Kwak, Ulsan (KR); Yong Tae Kim, Ulsan (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/991,449

(22) Filed: Nov. 21, 2022

(65) Prior Publication Data

US 2023/0142633 A1    May 11, 2023

Related U.S. Application Data

(62) Division of application No. 17/344,026, filed on Jun. 10, 2021, now abandoned.

(30) Foreign Application Priority Data

Jun. 22, 2020  (KR) ........................ 10-2020-0075974

(51) Int. Cl.
*B23P 19/06* (2006.01)
*B23P 19/00* (2006.01)

(52) U.S. Cl.
CPC ........... *B23P 19/069* (2013.01); *B23P 19/006* (2013.01)

(58) Field of Classification Search
CPC ....... B23P 19/006; B23P 19/06; B23P 19/069; F16H 1/28; F16H 2001/2872; F16H 1/46; B23Q 1/42; B23Q 1/58–585
See application file for complete search history.

(56) References Cited

U.S. PATENT DOCUMENTS

| | | | |
|---|---|---|---|
| 4,506,448 A | 3/1985 | Topping et al. | |
| 4,910,859 A | 3/1990 | Holcomb | |
| 2003/0009867 A1 | 1/2003 | Whiten et al. | |
| 2015/0119214 A1 | 4/2015 | Sasaki | |
| 2016/0146291 A1* | 5/2016 | Prunera-Usach | F02C 7/32 475/331 |

(Continued)

FOREIGN PATENT DOCUMENTS

| | | |
|---|---|---|
| CN | 104801962 A | 7/2015 |
| KR | 20180130293 A | 12/2018 |

*Primary Examiner* — Matthew P Travers
(74) *Attorney, Agent, or Firm* — Lempia Summerfield Katz LLC

(57) ABSTRACT

A fastening apparatus includes: a plurality of fastening tools; a first movement mechanism configured to rotate the plurality of fastening tools in a circumferential direction; a second movement mechanism configured to rectilinearly move the plurality of fastening tools in a radial direction; and a third movement mechanism configured to rectilinearly move the plurality of fastening tools in a vertical direction. In particular, the first movement mechanism includes a closed-curve guide unit having a closed-curve shape and configured to define a route along which the plurality of fastening tools rotates in the circumferential direction.

5 Claims, 5 Drawing Sheets

(56) References Cited

U.S. PATENT DOCUMENTS

2017/0157724 A1 6/2017 Ye et al.
2018/0272532 A1 9/2018 Gonoi et al.
2018/0339378 A1 11/2018 Bae et al.

* cited by examiner

METHOD OF OPERATING FASTENING APPARATUS AND FASTENING APPARATUS

CROSS-REFERENCE TO RELATED APPLICATIONS

This application is a divisional application of non-provisional U.S. patent application Ser. No. 17/344,026, filed on Jun. 10, 2021, which claims priority to and the benefit of Korean Patent Application No. 10-2020-0075974, filed on Jun. 22, 2020, the entire contents of each of which are incorporated herein by reference.

FIELD

The present disclosure relates to a method of operating a fastening apparatus and the fastening apparatus.

BACKGROUND

The statements in this section merely provide background information related to the present disclosure and may not constitute prior art.

Teaching methods, which enable robots used for production automation to move to desired positions, are broadly classified into a method that uses a teaching pendant including a display device, a keyboard, and the like that enables input and output for controlling the robot or executing programs, and a method in which a person applies force directly to the robot to move the robot. Examples the automated robot may include a nut runner that serves to fasten a fastener such as a nut to a fastening hole formed in a workpiece.

However, we have discovered that types of tasks, which can be performed by the automated robot, are extremely limited. For example, because the number and positions of fastening tools of the nut runner, which perform the fastening operations, are preset, there is a problem in that types and sizes of workpieces, which are to be fastened by the nut runner, are extremely limited.

In addition, when teaching the automated robot using the teaching pendant, the operation of the automated robot using theoretically derived position data is not often suitable for actual sites. For this reason, the position data is desired to be modified several times, which causes a problem in that an excessively large amount of time is required for the step of teaching the robot before performing the main task. In addition, in the case in which a person applies force directly to the robot to teach the robot, expensive components such as a force sensor are required, which causes a problem in that a large amount of costs are required to equip an automation production line.

SUMMARY

The present disclosure enables a robot used for production automation to perform tasks on various types of workpieces, shorten the time it takes to perform a step of teaching the robot, and reduce costs required to equip an automation production line.

In one form of the present disclosure, a method of operating a fastening apparatus includes: a fastening apparatus preparing step of preparing a fastening apparatus including n fastening tools; a first workpiece disposing step of disposing a first workpiece having m fastening holes at one side of the fastening apparatus; a first fastening tool disposing step of disposing each of the n the fastening tools above any one of the m fastening holes; and a first storage step of storing, in a control unit, positions of the n fastening tools in the first fastening tool disposing step, in which m is larger than n, and the plurality of first fastening tool disposing steps and the plurality of first storage steps are alternately performed.

The first fastening tool disposing steps and the first storage steps may be performed [m/n]+1 times (in which [m/n] is a maximum integer that does not exceed m/n), respectively.

In the first fastening tool disposing step, the fastening apparatus may be primarily moved in a vertical direction, and then the n fastening tools of the fastening apparatus may be moved in a horizontal direction.

In the first fastening tool disposing step, the n fastening tools may be simultaneously moved primarily in the vertical direction.

In the first fastening tool disposing step, the n fastening tools may be sequentially moved in the horizontal direction.

A movement of the n fastening tools of the fastening apparatus in a circumferential direction A and a movement of the n fastening tools of the fastening apparatus in a radial direction B may be performed independently, and in the first fastening tool disposing step, the n fastening tools may be moved in the circumferential direction A and then moved in the radial direction B.

The movement of the n fastening tools of the fastening apparatus in the circumferential direction A and the movement of the n fastening tools of the fastening apparatus in the radial direction B may be performed independently, and in the first fastening tool disposing step, the n fastening tools may be moved in the radial direction B and then moved in the circumferential direction A.

The method may further include: after the first storage step, a second workpiece disposing step of disposing a second workpiece comprising p fastening holes at one side of the fastening apparatus; a second fastening tool disposing step of disposing each of the n fastening tools above any one of the p the fastening holes; and a second storage step of storing, in the control unit, positions of the n fastening tools in the second fastening tool disposing step.

When the first workpiece and the second workpiece are workpieces identical in type to each other, the information stored in the control unit in the first storage step may be removed from the control unit after the second storage step.

When the first workpiece and the second workpiece are workpieces different in type from each other, the information stored in the control unit in the first storage step and the information stored in the control unit in the second storage step may coexist in the control unit after the second storage step.

In the first fastening tool disposing step, the fastening tool of the fastening apparatus may be moved in the horizontal direction, and then the fastening apparatus may be moved secondarily in the vertical direction.

In the first fastening tool disposing step, the fastening tool of the fastening apparatus may be moved in the horizontal direction, and then the fastening apparatus may be moved secondarily in a vertically downward direction.

The method may further include: after the first storage step, a fastening performing step of performing a fastening operation on the m fastening holes provided in the first workpiece by loading the information (i.e., the positions of the n fastening tools) stored in the control unit in the first storage step, using the n fastening tools, and using a fastener.

In the fastening performing step, when each of the n fastening tools performs the fastening operation on any one of the m fastening holes provided in the first workpiece and then moves to another fastening hole, the time it takes for one of the n fastening tools to move may be equal to the time it takes for the other fastening tools to move.

In order to achieve the above-mentioned object, another aspect of the present disclosure provides a fastening apparatus including: a plurality of fastening tools; a first movement mechanism configured to rotate the plurality of fastening tools in a circumferential direction A; a second movement mechanism configured to rectilinearly move the fastening tools in a radial direction B; and a third movement mechanism configured to rectilinearly move the fastening tools in a vertical direction C, in which the first movement mechanism includes a closed-curve guide unit having a closed-curve shape and configured to define a route along which the fastening tool rotates in the circumferential direction A, and the plurality of closed-curve guide units is provided.

The second movement mechanism may include: a screw unit extending in the radial direction B, having a screw structure, and configured to rotate so that the fastening tool rectilinearly moves in the radial direction B; a horizontal movement unit provided to engage with the screw unit and coupled, at one side, to the fastening tool; and a horizontal guide unit coupled to the horizontal movement unit in order to define a route along which the fastening tool rectilinearly moves in the radial direction B, and the plurality of horizontal guide units and the plurality of horizontal movement units may be provided.

One end portion of any one of the plurality of horizontal guide units and one end portion of another of the plurality of horizontal guide units may meet together, and a stepped portion may be formed in a region in which the plurality of horizontal guide units meets together.

According to the present disclosure, it is possible to enable the robot used for production automation to perform tasks on various types of workpieces, shorten the time it takes to perform the step of teaching the robot, and reduce costs required to equip an automation production line.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
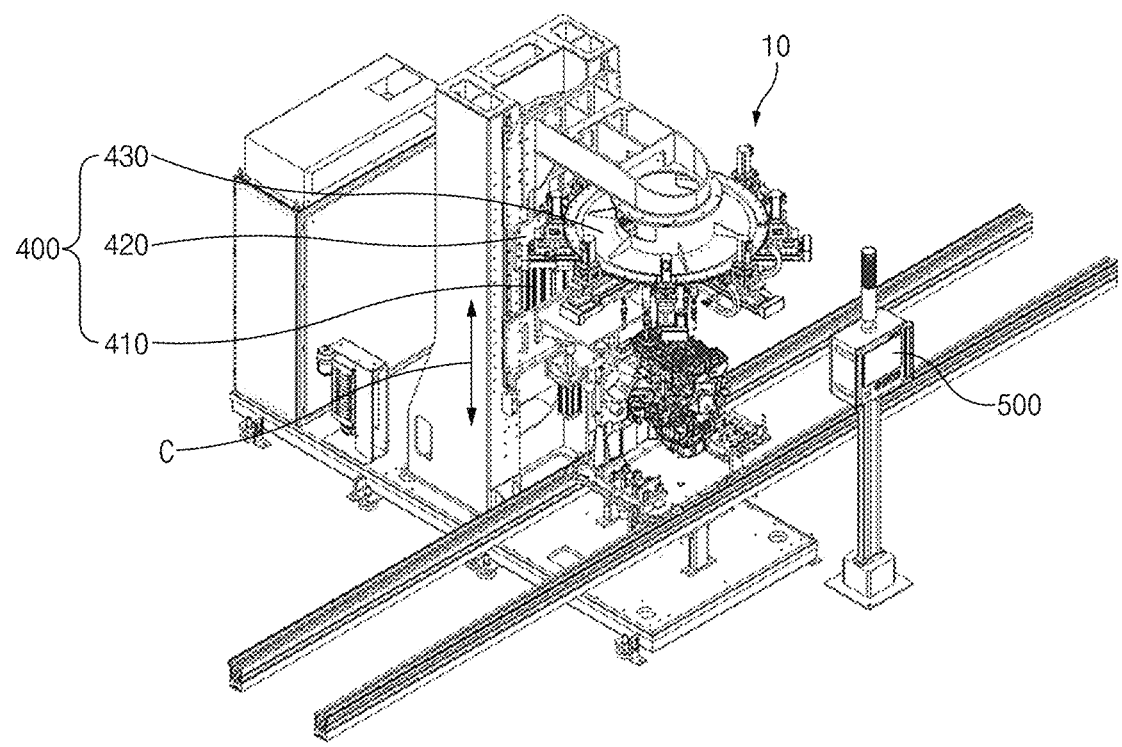
FIG. 1 is a perspective view illustrating an entire structure of a fastening apparatus according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a fastening apparatus and a method of operating the fastening apparatus according to some forms of the present disclosure will be described with reference to drawings.

Figure 2:
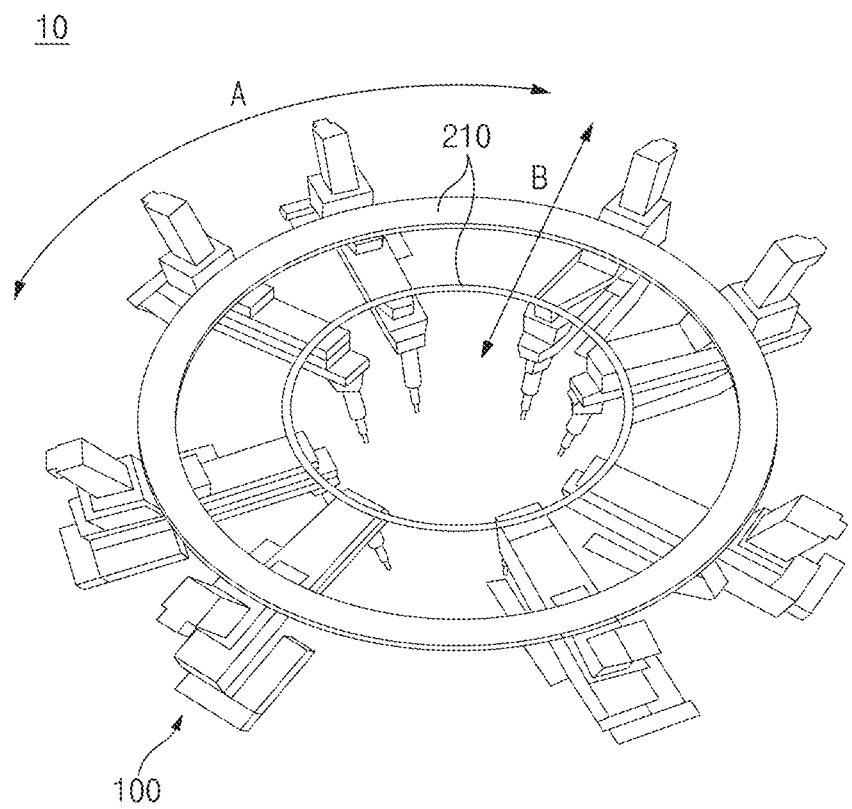
FIG. 2 is a perspective view illustrating structures fastening tools, a first movement mechanism, and a second movement mechanism of the fastening apparatus according to some forms of the present disclosure.
Figure 3:
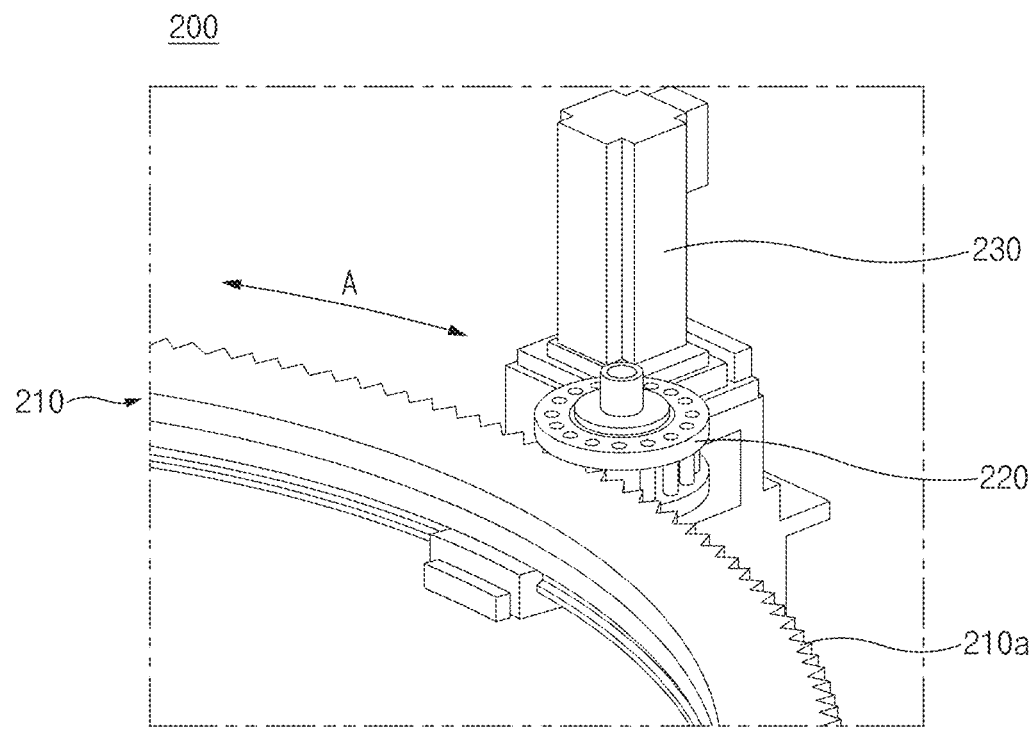
FIG. 3 is a perspective view illustrating an example of the structure of the first movement mechanism of the fastening apparatus according to one form of the present disclosure.
Figure 4:
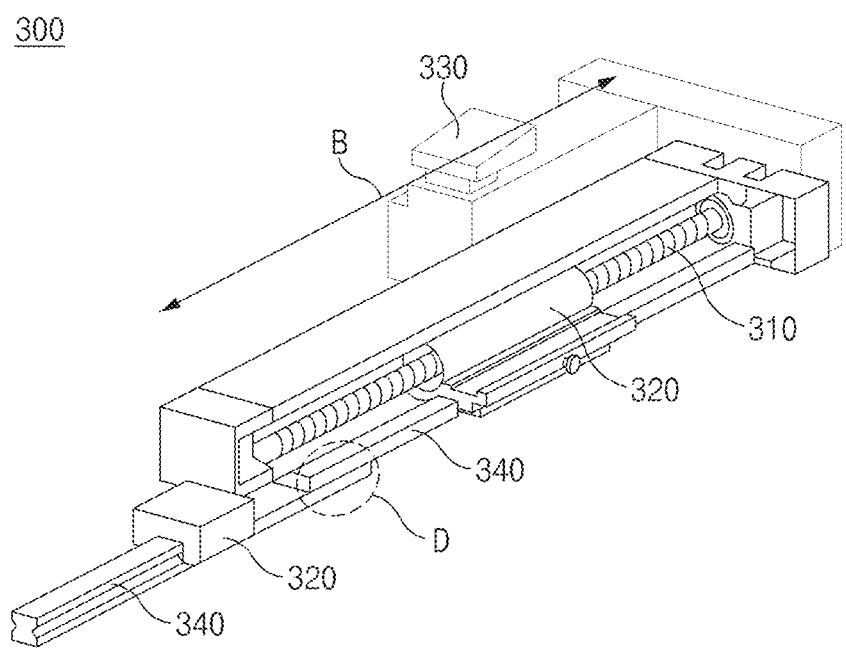
FIG. 4 is a perspective view illustrating an example of the structure of the second movement mechanism of the fastening apparatus according to another form of the present disclosure.

FIG. 1 is a perspective view illustrating an entire structure of a fastening apparatus according to one form of the present disclosure, and FIG. 2 is a perspective view illustrating structures fastening tools, a first movement mechanism, and a second movement mechanism of the fastening apparatus according to some forms of the present disclosure. FIG. 3 is a perspective view illustrating an example of the structure of the first movement mechanism of the fastening apparatus according to another form of the present disclosure, and FIG. 4 is a perspective view illustrating an example of the structure of the second movement mechanism of the fastening apparatus according to one form of the present disclosure.

As illustrated in FIGS. 1 and 2, a fastening apparatus 10 may include a plurality of fastening tools 100. For example, the plurality of fastening tools 100 may be a plurality of nut runners. FIGS. 1 and 2 illustrate that the eight fastening tools 100 are provided on the fastening apparatus 10. However, the number of fastening tools 100 is not limited thereto.

According to the present disclosure, the fastening apparatus 10 may move in a vertical direction and a horizontal direction. In more detail, referring to FIGS. 3 and 4, the fastening apparatus 10 may include first movement mechanisms 200 configured to rotate the fastening tools 100 in a circumferential direction "A", second movement mechanisms 300 configured to rectilinearly move the fastening tools 100 in a radial direction "B", and a third movement mechanism 400 configured to rectilinearly move the fastening tools 100 in a vertical direction (i.e., an upward/downward direction).

Referring to FIG. 3, the first movement mechanism 200 may include a closed-curve guide unit 210 that has a closed-curve shape and provides a route along which the fastening tool 100 (see FIG. 2) rotates in the circumferential direction A. As illustrated in FIGS. 2 and 3, the closed-curve guide unit 210 may have a circular shape.

In this case, a gear portion 210a may be provided at one side of the closed-curve guide unit 210, and a pinion gear 220 may engage with the gear portion 210a. Therefore, when the pinion gear 220 rotates, the pinion gear 220 may move in the circumferential direction A along the closed-curve guide unit 210 by means of the engagement between the gear portion 210a and the pinion gear 220. In this case, the fastening tool 100 may be connected to a lower portion of the first movement mechanism 200. In this case, when the pinion gear 220 rotates, the fastening tool 100 may also rotate in the circumferential direction A along the closed-curve guide unit 210. Meanwhile, FIG. 3 illustrates that the gear portion 210a is provided on a radial outer surface of the closed-curve guide unit 210 and the pinion gear 220 is also provided to face the radial outer surface of the closed-curve guide unit 210. However, instead, the gear portion 210a may be provided on a radial inner surface of the closed-curve guide unit 210, and the pinion gear 220 may also be provided to face the radial inner surface of the closed-curve guide unit 210. Meanwhile, the first movement mechanism 200 may further include a first power unit 230 configured to provide power to rotate the pinion gear 220.

Meanwhile, a rotational speed of the first power unit 230 may be relatively higher than a rotational speed required for the pinion gear 220. In this case, the rotational speed needs to be reduced before the power of the first power unit 230 is transmitted to the pinion gear 220. To this end, a speed reducer (not illustrated) may be provided in a power transmission path between the first power unit 230 and the pinion gear 220. In particular, according to the present disclosure, the speed reducer may be provided in the pinion gear 220. That is, the pinion gear 220 and the speed reducer may have an integrated structure. This is advantageous because a separate space for providing the pinion gear 220 is not additionally required.

Meanwhile, the plurality of first movement mechanisms 200 may be provided, and the number of first movement mechanisms 200 may be equal to the number of fastening tools 100. Therefore, the plurality of first movement mechanisms 200 and the plurality of fastening tools 100 may correspond to one another in a one-to-one manner. In this case, the movements of the plurality of fastening tools 100 in the circumferential direction A may be individually performed.

Meanwhile, according to the present disclosure, the plurality of closed-curve guide units 210 may be provided. In more particularly, the plurality of closed-curve guide units 210 may have a concentric structure having the same central axis. FIG. 2 illustrates that the two closed-curve guide units 210 each having a circular shape are disposed to have the concentric structure, one side of the fastening tool 100 is coupled to one of the two closed-curve guide units 210 which has a large outer diameter, and the other side of the fastening tool 100 is coupled to the other of the two closed-curve guide units 210 which has a small outer diameter.

According to the present disclosure, it is possible to solve a problem of deformation of the first movement mechanism 200 including the closed-curve guide units 210 caused by weights of the fastening tools 100 or loads applied to the fastening tools 100 while the fastening tools 100 move in the circumferential direction A. In particular, as described below, according to the present disclosure, the fastening tool 100 may be moved in the circumferential direction A by force applied by a person during a teaching process of the fastening apparatus 10. If the single closed-curve guide unit 210 is provided, there may occur a problem in that the closed-curve guide unit 210 is distorted during the teaching process of the fastening apparatus 10. However, according to the present disclosure, the plurality of closed-curve guide units 210 having the concentric structure may be coupled to the fastening tools 100, respectively, such that overall rigidity of the closed-curve guide units 210 may be improved, thereby solving the problem of deformation of the first movement mechanism 200.

Meanwhile, referring to FIG. 4, the second movement mechanism 300 may include a screw unit 310 extending in the radial direction B and configured to rotate so that the fastening tool 100 (see FIG. 2) rectilinearly moves in the radial direction B.

In this case, the screw unit 310 may have a screw structure, and a horizontal movement unit 320 engages with the screw structure. Therefore, when the screw unit 310 rotates about a central axis of the screw unit 310, the horizontal movement unit 320 engaging with the screw structure may rectilinearly move in the radial direction B. In this case, the fastening tool 100 may be connected to one side of the second movement mechanism 300. In more detail, the fastening tool 100 may be coupled to one side of the horizontal movement unit 320. In this case, as the screw unit 310 rotates, the fastening tool 100 may also rectilinearly move in the radial direction B along with the horizontal movement unit 320. Meanwhile, the second movement mechanism 300 may further include a second power unit 330 configured to provide power to rotate the screw unit 310.

Meanwhile, the plurality of second movement mechanisms 300 may be provided, and the number of second movement mechanisms 300 may be equal to the number of fastening tools 100. Therefore, the plurality of second movement mechanisms 300 and the plurality of fastening tools 100 may correspond to one another in a one-to-one manner. Therefore, the movements of the plurality of fastening tools 100 in the radial direction B may also be performed individually.

Next, referring to FIG. 4, the second movement mechanism 300 may further include a horizontal guide unit 340 coupled to the horizontal movement unit 320 in order to define a route along which the fastening tool 100 (see FIG. 2) rectilinearly moves in the radial direction B. That is, the horizontal guide unit 340 is configured to define a predetermined route so that the horizontal movement unit 320 may rectilinearly moves along the predetermined route when the horizontal movement unit 320 is rectilinearly moved by the rotation of the screw unit 310. Therefore, as illustrated in FIG. 4, a direction in which the horizontal guide unit 340 extends may be in parallel with a direction in which the screw unit 310 extends.

In this case, according to the present disclosure, the plurality of horizontal movement units 320 and the plurality of horizontal guide units 340 may be provided, and the horizontal movement units 320 may be coupled to the plurality of horizontal guide units 340, respectively. FIG. 4 illustrates that the two horizontal guide units 340 are provided in a row in the radial direction B and provided such that one end portion of the horizontal guide unit provided outside in the radial direction B and one end portion of the horizontal guide unit provided inside in the radial direction B meet together, and the horizontal movement units 320 are coupled to the two horizontal guide units 340, respectively.

According to the present disclosure, it is possible to solve a problem of deformation of the second movement mechanism 300 including the horizontal guide units 340 caused by weights of the fastening tools 100 or loads applied to the fastening tools 100 while the fastening tools 100 move in the radial direction A. In particular, as described below, according to the present disclosure, the fastening tool 100 may be moved in the radial direction B by force applied by a person during the teaching process of the fastening apparatus 10. If the single horizontal guide unit 340 and the single horizontal movement unit 320 are provided, there may occur a problem in that the horizontal guide unit 340 is distorted during the teaching process of the fastening apparatus 10. However, according to the present disclosure, the plurality of horizontal guide units 340 is provided in a row in the radial direction B, and the plurality of horizontal movement units 320 coupled to the plurality of horizontal guide units 340 may be coupled to the fastening tools 100, respectively, such that the overall rigidity of the horizontal guide units 340 may be improved, thereby solving the problem of deformation of the second movement mechanism 300. Meanwhile, as illustrated in FIG. 4, the plurality of horizontal guide units 340 are provided in a row in the radial direction B, a stepped portion D may be provided in a region in which the plurality of horizontal guide units 340 meets together.

Meanwhile, referring to FIG. 1, the third movement mechanism 400 may include a vertical guide unit 410 extending in a vertical direction C and configured to define a route along which the fastening tool 100 rectilinearly moves in the vertical direction C.

In this case, a vertical movement unit 420 may be provided at one side of the vertical guide unit 410, and the vertical movement unit 420 may move in the vertical direction C along the vertical guide unit 410. In this case, the fastening tools 100 may be connected to one side of the third movement mechanism 400. In this case, as the vertical movement unit 420 rectilinearly moves in the vertical direction C along the vertical guide unit 410, the plurality of fastening tools 100 may also rectilinearly move in the vertical direction C.

Meanwhile, unlike the first movement mechanisms 200 and the second movement mechanisms 300, the single third movement mechanism 400 may be provided. In more detail, the single third movement mechanism 400 may simultaneously move the plurality of fastening tools 100 in the vertical direction C. For example, the third movement mechanism 400 may include a connection body unit 430 connected to the vertical movement unit 420 and configured to fix the plurality of fastening tools 100. When the connection body unit 430 moves along with the movement of the vertical movement unit 420, the plurality of fastening tools 100 may also rectilinearly move simultaneously in the vertical direction C.

Meanwhile, according to the present disclosure, the fastening apparatus 10 or the fastening tools 100 may be moved by force applied by a person during the teaching process of the fastening apparatus 10. In more detail, with the force applied by the person, the fastening apparatus 10 may be moved in the vertical direction C along the vertical guide unit 410, and the plurality of fastening tools 100 may be moved in the circumferential direction A along the closed-curve guide units 210, respectively, and moved in the radial direction B along the horizontal guide units 340, respectively.

In this case, a magnitude of external force (i.e., the force applied by the person) required to move each of the fastening tools 100 in the circumferential direction A or the radial direction B may be 40 N to 60 N. For example, the configuration in which the external force required to move the fastening tool 100 in the circumferential direction A or the radial direction B is 50 N may mean that a minimum value of the external force required to move the fastening tool 100 in the circumferential direction A or the radial direction B is 50 N. If the external force required to move the fastening tool 100 in the circumferential direction A or the radial direction B is lower than 40 N, the fastening tool 100 may be moved by external impact or the like against a user's intention. In contrast, if the external force required to move the fastening tool 100 in the circumferential direction A or the radial direction B is higher than 60 N, an operating force applied by the person may be significantly low during the teaching process of the fastening apparatus 10.

Meanwhile, as illustrated in FIG. 1, the fastening apparatus 10 may further include a display 500 configured to display visual information in order to enable the person to control the operations of the fastening apparatus 10 or the fastening tools 100 and store information on the positions of the fastening tools 100. Hereinafter, a method of operating the fastening apparatus according to the present disclosure will be described.

The method of operating the fastening apparatus according to the present disclosure may include a fastening apparatus preparing step of preparing the fastening apparatus 10 including the n fastening tool 100. For example, the fastening apparatus 10 may include the eight fastening tools 100.

In addition, the method of operating the fastening apparatus according to the present disclosure may include a first workpiece disposing step of disposing a first workpiece including m fastening holes at one side of the fastening apparatus 10. In this case, according to the present disclosure, m may be larger than n. For example, the first workpiece may include a total of twenty-two fastening holes.

Meanwhile, the method of operating the fastening apparatus according to the present disclosure may further include a first fastening tool disposing step of disposing each of the n fastening tools 100 above any one of the m fastening holes. For example, when the eight fastening tools and the twenty-two fastening holes are provided, the eight fastening tools 100 may be disposed above the eight fastening holes among the twenty-two fastening holes, respectively, in the first fastening tool disposing step.

In addition, the method of operating the fastening apparatus according to the present disclosure may further include a first storage step of storing, in a control unit, positions of the n fastening tools 100 disposed in the above-mentioned first fastening tool disposing step. For example, when the eight fastening tools and the twenty-two fastening holes are provided, the positions of the eight fastening tools 100 disposed in the first fastening tool disposing step may be stored in the control unit in the first storage step. The information on the positions of the fastening tools 100 stored in the first storage step may be loaded in the following fastening operation step using the fastening tools, and the fastening tools 100 may move to the portions above the fastening holes on the basis of the loaded information. Therefore, after the information is stored, the fastening operation of the fastening apparatus may be automatically performed on the fastening holes.

As described above, m may be larger than n. That is, the number of fastening holes provided in the first workpiece may be larger than the number of fastening tools 100 provided in the fastening apparatus 10. Therefore, in a case in which the first fastening tool disposing step and the first storage step are performed only once, the fastening operations of the fastening tools 100 cannot be performed, in the fastening operation step later, on the fastening holes above which the fastening tools 100 are not disposed in the first fastening tool disposing step, among the plurality of fastening holes provided in the first workpiece.

Therefore, according to the present disclosure, the plurality of first fastening tool disposing steps and the plurality of first storage steps may be alternately performed.

In more detail, the first fastening tool disposing steps and the first storage steps may be performed [m/n]+1 times, respectively. In this case, [m/n] means a maximum integer that does not exceed m/n. For example, when the eight fastening tools and the twenty-two fastening holes are provided, the first fastening tool disposing steps and the first storage steps may be alternately performed [22/8]+1 times, that is, three times, respectively. In this case, in the first fastening tool disposing step which is performed second or subsequently, the fastening tools 100 may be disposed above the fastening holes above which the fastening tools 100 have not been disposed in the first fastening tool disposing step which has been performed first among the plurality of first fastening tool disposing steps. Further, in the first storage step which is performed second or subsequently, the information on the positions of the fastening tools 100 may be stored. As a result, in the later fastening operation step, the fastening operation may be automatically performed on all the fastening holes provided in the first workpiece.

Meanwhile, according to the present disclosure, in the first fastening tool disposing step, the fastening apparatus 10 including the fastening tools 100 may be moved primarily in the vertical direction, and then the fastening tools 100 of the fastening apparatus 10 may be moved in the horizontal direction. In this case, the primary movement of the fastening apparatus 10 in the vertical direction may be performed by the third movement mechanism 400 (see FIG. 1), and the movements of the fastening apparatus 10 in the horizontal direction may be performed by the first movement mechanisms 200 (see FIG. 3) and the second movement mechanisms 300 (see FIG. 4).

Therefore, in the first fastening tool disposing step, the n fastening tools 100 may be simultaneously moved in the vertical direction primarily.

In contrast, in the first fastening tool disposing step, the n fastening tools 100 may be sequentially moved in the horizontal direction. In more detail, the movements of the plurality of fastening tools 100 in the circumferential direction A and the movements of the plurality of fastening tools 100 in the radial direction B may be independently performed by the first movement mechanisms 200 and the second movement mechanisms 300, respectively. In this case, according to the exemplary form of the present disclosure, in the first fastening tool disposing step, the fastening tool 100 may be moved in the circumferential direction A, and then moved in the radial direction B. However, on the contrary, according to another exemplary form of the present disclosure, in the first fastening tool disposing step, the fastening tool 100 may be moved in the radial direction B, and then moved in the circumferential direction A.

Meanwhile, the method of operating the fastening apparatus according to the present disclosure may further include after the first storage step, a second workpiece disposing step of disposing a second workpiece including p fastening holes at one side of the fastening apparatus 10, a second fastening tool disposing step of disposing each of the n fastening tools 100 above any one of the p fastening holes, and a second storage step of storing, in the control unit, positions of the n fastening tools 100 in the second fastening tool disposing step. In this case, p may be larger than n.

In addition, according to the present disclosure, in a case in which the first workpiece and the second workpiece are workpieces identical in type to each other, the information stored in the control unit in the first storage step may be removed from the control unit after the second storage step. That is, in the case in which the first workpiece and the second workpiece are the workpieces identical in type to each other, the information stored in the control unit in the first storage step may be replaced with the information stored in the control unit in the second storage step. Therefore, according to the present disclosure, when it is desired to change the information, which has been previously stored in the control unit in respect to the positions of the fastening holes formed in the workpiece, to new information, the second fastening tool disposing steps and the second storage steps are alternately performed, thereby easily changing the information on the positions of the fastening holes formed in the workpiece. Therefore, it is possible to shorten the time it takes to perform the teaching process of the fastening apparatus 10 for performing the fastening operation.

In contrast, according to the present disclosure, in a case in which the first workpiece and the second workpiece are workpieces different in type from each other, the information stored in the control unit in the first storage step and the information stored in the control unit in the second storage step may coexist in the control unit after the second storage step. Therefore, according to the present disclosure, the information on positions of fastening holes of various types of workpieces may be stored in the control unit, it is possible to perform the fastening operations on various types of workpieces using the single fastening apparatus. In particular, the fastening apparatus according to the present disclosure may independently perform not only the movement in the vertical direction, but also the movement in the circumferential direction and the movement in the radial direction, and as a result, the fastening apparatus may effectively perform the fastening operations on various types of workpieces.

Meanwhile, according to the present disclosure, the first fastening tool disposing step may further include moving the fastening tool 100 of the fastening apparatus 10 in the horizontal direction and then secondarily moving the fastening apparatus 10 in the vertical direction. Therefore, the first fastening tool disposing step may sequentially include (i) primarily moving the fastening apparatus 10 in the vertical direction, (ii) moving the fastening tool 100 in the horizontal direction, and (iii) secondarily moving the fastening apparatus 10 in the vertical direction. In more detail, the step (iii) may be the step of secondarily moving the fastening apparatus 10 in the vertically downward direction. In addition, the step (i) may be the step of primarily moving the fastening apparatus 10 in the vertical direction so that the fastening tool 100 of the fastening apparatus 10 and the fastening hole provided in the first workpiece are spaced apart from each other at a predetermined interval, and the step (iii) may be the step of secondarily moving the fastening apparatus 10 later in the vertically downward direction so that the fastening tool 100 of the fastening apparatus 10 is adjacent to the fastening hole to the extent that the fastening tool 100 may perform the fastening operation on the fastening hole provided in the first workpiece. For example, in the step (i), the vertical interval between the fastening tool 100 and the fastening hole may be about 5 mm.

Meanwhile, the contents described regarding the first fastening tool disposing step may also be equally applied to the second fastening tool disposing step. That is, according to the present disclosure, the second fastening tool disposing step may sequentially include (i) primarily moving the fastening apparatus 10 in the vertical direction, (ii) moving the fastening tool 100 in the horizontal direction, and (iii) secondarily moving the fastening apparatus 10 in the vertical direction. In more detail, the step (iii) may be the step of secondarily moving the fastening apparatus 10 in the vertically downward direction. In addition, the step (i) may be the step of primarily moving the fastening apparatus 10 in the vertical direction so that the fastening tool 100 of the fastening apparatus 10 and the fastening hole provided in the second workpiece are spaced apart from each other at a predetermined interval, and the step (iii) may be the step of secondarily moving the fastening apparatus 10 later in the vertically downward direction so that the fastening tool 100 of the fastening apparatus 10 is adjacent to the fastening hole to the extent that the fastening tool 100 may perform the fastening operation on the fastening hole provided in the first workpiece. For example, in the step (i), the vertical interval between the fastening tool 100 and the fastening hole may be about 5 mm.

Meanwhile, the method of operating the fastening apparatus according to the present disclosure may further include after the first storage step, a fastening performing step of performing the fastening operation on the m fastening holes provided in the first workpiece by loading the information stored in the control unit in the first storage step, using the n fastening tools 100, and using fasteners such as nuts. In more detail, in the fastening performing step, the fastening apparatus 10 or the fastening tool 100 may be moved on the basis of the information stored in the first storage step in respect to the positions of the fastening holes, and then the fastening operation may be performed on the fastening hole by each of the fastening tools 100. In this case, since the number of fastening holes is larger than the number of fastening tools as described above, the process of moving the fastening tools 100 to the fastening holes, on which the fastening operations have not been performed, may be additionally required after the first fastening operations of the fastening tools 100 are performed on the fastening holes.

In this case, according to the present disclosure, in the fastening performing step, when each of the n fastening tools 100 performs the fastening operation on any one of the m fastening holes provided in the first workpiece and then moves to another fastening hole, the movement time it takes for one of the n fastening tools to move may be equal to the movement time it takes for the other fastening tools to move. In this case, it is possible to remove difference in movement time between the fastening tools in accordance with movement distances of the fastening tools when the fastening tools move to other fastening holes after performing the fastening operation on some fastening holes. As a result, it is possible to minimize the time it takes to perform the fastening operation. For example, the movement time may be one second.

Figure 5:
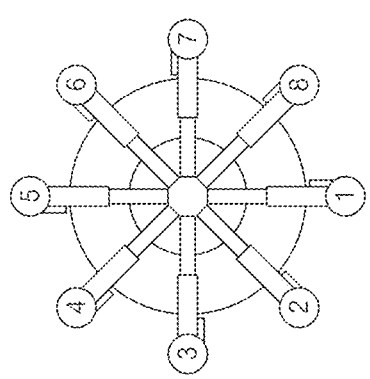
FIG. 5 is a perspective view illustrating an example of a display provided on a control unit of the fastening apparatus according to one form of the present disclosure.

FIG. 5 is a perspective view illustrating an example of the display provided on the control unit of the fastening apparatus according to the present disclosure.

A process of manipulating the display in accordance with the method of operating the fastening apparatus according to the present disclosure will be described below with reference to FIG. 5.

According to the present disclosure, the first workpiece is selected, and then the type of the first workpiece is selected in 'TYPE SELECTION' on the display. In this case, in a case in which the type of the first workpiece is a type already stored in the control unit, for example, in a case in which the first workpiece is a new U oil pan, 'NEW U OIL PAN' is selected on the display. In contrast, in a case in which the type of the first workpiece is a type which is not stored in the control unit, a blank box is selected in 'TYPE SELECTION. Hereinafter, the case in which the first workpiece is the 'new U oil pan' will be mainly described.

After the type of the first workpiece is selected in 'TYPE SELECTION' and the first workpiece is disposed at one side of the fastening apparatus, each of the plurality of fastening tools is positioned above any one of the plurality of fastening holes. In this case, the movement of the fastening tool may be performed as a user selects each column positioned below 'STORE TARGET' in FIG. 5 and then directly inputs coordinates of the position, or the movement of the fastening tool may be performed as a person applies force directly to the fastening tool. In particular, the movement of the fastening apparatus in the vertical direction may be performed by adjusting the time for which 'Z JOG +' or 'Z JOG −' is pushed on the display illustrated in FIG. 5.

Thereafter, 'ENTER DATA' is selected to store the current position of the fastening tool, that is, the position of the fastening hole to be fastened later during the fastening process. In this case, the current position of the fastening tool may be stored after '#1' is selected on the display. In this case, '#1' means the fastening holes which constitute a 'first group' among the fastening holes of the first workpiece. Since the number of fastening holes is larger than the number of fastening tools as described above, the process of storing the positions of the fastening holes of the first workpiece needs to be performed several times.

Therefore, afterwards, the plurality of fastening tools is moved so that the plurality of fastening tools is positioned above the fastening holes above which the fastening tools have not been positioned in the previous step, among the plurality of fastening holes. Further, 'ENTER DATE' is selected again to store the current position of the fastening tool, that is, the position of the fastening hole to be fastened later during the fastening process. In this case, the current position of the fastening tool may be stored after '#2' is selected on the display. In this case, '#2' means the fastening holes which constitute a 'second group' among the fastening holes of the second workpiece.

The above-mentioned storage processes may be repeated in accordance with the number of fastening holes. For example, in the case in which the number of fastening tools is eight and the number of fastening holes is twenty-two, the above-mentioned processes may be repeated until '#3' is selected and the current position of the fastening tool is stored. In addition, in a case in which the number of fastening tools is eight and even '#5' may be selected as illustrated in FIG. 5, the positions of the fastening tool with respect to a total of forty fastening holes may be stored in the control unit.

The present disclosure has been described with reference to the limited exemplary forms and the drawings, but the present disclosure is not limited thereto. The described exemplary forms may be carried out in various forms by those skilled in the art to which the present disclosure pertains within the technical spirit of the present disclosure.

What is claimed is:

1. A fastening apparatus comprising:
   a plurality of fastening tools;
   a first movement mechanism comprising:
      a closed-curve guide unit having a closed-curve shape, and
      a plurality of pinion gears configured to be rotated;
   a second movement mechanism comprising:
      at least one screw unit,
      at least one horizontal movement block configured to engage with the at least one screw unit and coupled to respective fastening tools of the plurality of fastening tools such that the fastening tools rectilinearly move in a radial direction when the at least one screw unit rotates,
      at least one horizontal guide unit coupled to the at least one horizontal movement block and configured to define a route along which the fastening tools rectilinearly move in the radial direction; and
   wherein the fastening apparatus is further configured to rectilinearly move the plurality of fastening tools in a vertical direction,
   wherein the closed-curve guide unit is formed with a gear portion on a radial surface thereof and configured to define a route along which the plurality of fastening tools rotates in a circumferential direction,
wherein a pinion gear among the plurality of pinion gears is configured to engage with the gear portion of the closed-curve guide unit and a respective one of the plurality of fastening tools is configured to rotate along the circumferential direction when the pinion gear rotates, and
wherein:
   the at least one horizontal movement block includes a plurality of horizontal movement blocks, and the at least one horizontal guide unit includes a plurality of horizontal guide units,
   one end portion of a first horizontal guide unit of the plurality of horizontal guide units and one end portion of a second horizontal guide unit of the plurality of horizontal guide units meet together, and
   a stepped portion is formed in a region in which the one end portion of the first horizontal guide unit meets the one end portion of the second horizontal guide unit.

2. The fastening apparatus of claim 1,
   wherein a first guide portion is provided on a radial inner surface of the closed-curve guide unit, and
   wherein the first movement mechanism is configured to engage the first guide portion of the closed-curve guide unit.

3. The fastening apparatus of claim 2,
   wherein a second guide portion is provided inside of the radial inner surface of the closed-curve guide unit, and
   wherein the first movement mechanism is configured to engage the second guide portion of the closed-curve guide unit.

4. The fastening apparatus of claim 1, further comprising a speed reducer provided in the plurality of pinion gears.

5. The fastening apparatus of claim 1, wherein the at least one screw unit is configured to extend in the radial direction and has a screw structure, and the at least one horizontal movement block is coupled to a first side of the respective fastening tools of the plurality of fastening tools.

\* \* \* \* \*